Figure 1:
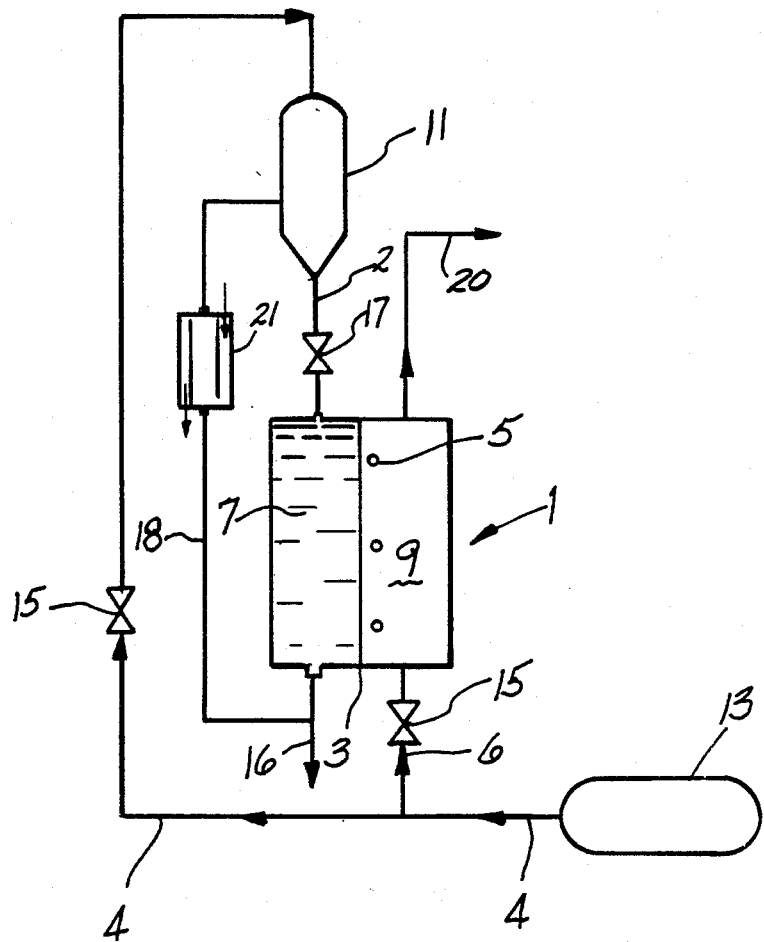

Patent Number: 4,851,125
… Date of Patent: Jul. 25, 1989

[54] PROCESS FOR CONCENTRATING AQUEOUS SOLUTIONS OF HYDROXYLAMMONIUM SALTS

[75] Inventors: Ronald L. Dotson, Cheshire; Robert T. Brooker, Watertown, both of Conn.

[73] Assignee: Olin Corporation, Cheshire, Conn.

[21] Appl. No.: 179,944

[22] Filed: Apr. 11, 1988

[51] Int. Cl.$^4$ .............................................. B01D 13/00
[52] U.S. Cl. ................................... 210/638; 210/640; 210/651
[58] Field of Search ............... 210/638, 640, 650, 651, 210/652, 654; 204/182.4

[56] References Cited

U.S. PATENT DOCUMENTS 4,552,636 11/1985 van den Brink ................. 204/182.4

Primary Examiner—Frank Spear
Attorney, Agent, or Firm—James B. Haglind

[57] ABSTRACT

Concentrated solutions of inorganic hydroxylammonium salts can safely be produced in a process for concentrating a dilute solution of an inorganic hydroxylammonium salt by contact with a membrane having a sorption side and a desorption side. The process comprises contacting the dilute solution with the sorption side of a membrane, which is substantially permeable to the solvent and substantially impermeable to the solute of the solution, to sorb the solvent and permit the solvent to flow through the membrane to the desorption side. Desorbing the solvent from the desorption side of the membrane.

Highly concentrated aqueous solutions of hydroxylammonium salts which are heat sensitive are produced by the novel process of the invention which does not require directly heating the solution and is substantially free of hazards.

21 Claims, 2 Drawing Sheets

PROCESS FOR CONCENTRATING AQUEOUS SOLUTIONS OF HYDROXYLAMMONIUM SALTS

This invention is related to the concentration of solutions of hydroxylammonium salts. More particularly, this invention relates to the concentration of aqueous solutions of hydroxylammonium salts.

Hydroxylamine forms salts with an extensive group of inorganic acids which are in general less stable than the corresponding ammonium salts and are more hydrolyzed in aqueous solution. Solutions of hydroxylammonium salts (also known as hydroxylamine salts) may be prepared, for example, by the electrolysis, at suitable cathodes, of nitric acid in an aqueous mineral acid solution, e.g. sulfuric acid or hydrochloric acid. The concentration of these solutions by methods which require heating such as distillation or evaporation results in some decomposition. This is particularly true for aqueous solutions of hydroxylammonium nitrate which are very susceptible to decomposition when heated. For example, a concentrated aqueous solution of hydroxylammonium nitrate is employed as a component of a liquid propellant. Commercially available solutions are, however, quite dilute, being shipped in polyethylene containers at a maximum concentration of 16 percent and should be kept at temperatures below 60° C.

Further, accurate control of the concentration of the hydroxylammonium salt by these methods is difficult to attain.

There is a need, therefore, for a process for concentrating aqueous solutions of heat-sensitive materials such as hydroxylammonium salts which can be operated safely, which prevents or minimizes decomposition of the hydroxylammonium salt, and in which accurate control of the concentration can be attained.

Now it has been found that concentrated solutions of inorganic hydroxylammonium salts can safely be produced in a process for concentrating a dilute solution of an inorganic hydroxylammonium salt in a solvent in contact with a membrane having a sorption side and a desorption side, which process comprises (a) contacting the dilute solution with the sorption side of a membrane, which is substantially permeable to the solvent and substantially impermeable to the solute of said solution, to sorb the solvent and permit the solvent to flow through the membrane to the desorption side, whereby a concentrated solution of hydroxylammonium salt is produced, and (b) desorbing the solvent from the desorption side of the membrane.

FIG. 1 schematically represents one embodiment of the process of the present invention.

Figure 2:
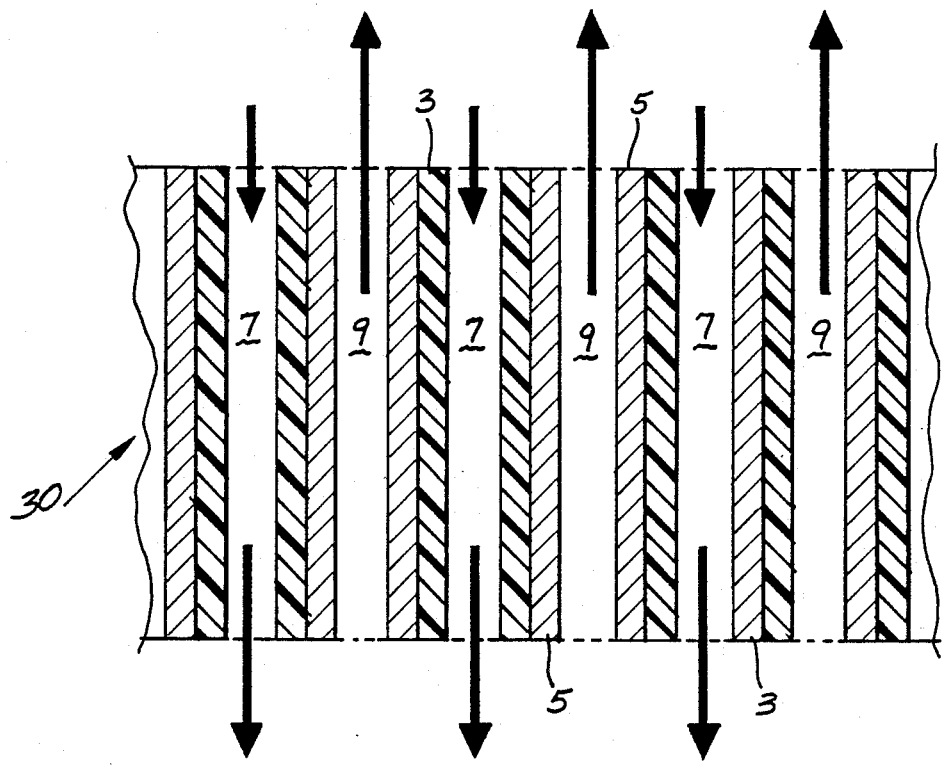

FIG. 2 schematically illustrates a multicell unit suitable for use in the process of the present invention.

FIG. 1 schematically illustrates one embodiment of the process of the present invention having cell 1 which is divided by membrane 3 into liquid chamber 7 and gas chamber 9. Membrane 3 is supported by membrane supports 5 positioned in gas chamber 9. During operation an aqueous solution of a hydroxylammonium salt is fed from reservoir 11 thru lines 2 to liquid chamber 7. A gas is charged from tank 13 through lines 4 and 6 into gas chamber 9. The gas may also be charged through line 4 to provide a gas pad in reservoir 11. In lines 4 and 6 gas valves 15 regulate the flow of the gas, likewise valve 17 regulates the flow of the aqueous solution in line 2. A concentrated aqueous solution of hydroxylammonium salt is removed from liquid chamber 7 through line 16 where, if further returned to reservoir 11 through line 18 and may be cooled or heated in heat exchanger 21. Gas containing the solvent is removed from gas chamber 9 through line 20.

Multicell unit 30 illustrated in FIG. 2 contains a series of liquid chambers 7 and gas chambers 9 separated by membranes 3. Membranes 3 are supported by porous membrane supports 5 positioned in gas chambers 9. The solution of hydroxylammonium salt to be concentrated is passed through liquid chambers 7 which may be interconnected to provide continuous circulation of the solution. Solvent passing through membranes 3 and porous membrane supports 5 is desorbed, for example, by applying a vacuum.

The novel process of the present invention may be employed with solutions of any inorganic hydroxylammonium salts. Suitable examples include solutions of hydroxylammonium halides such as hydroxylammonium hydrochloride and hydroxylammonium bromide; hydroxylammonium sulfates including hydroxylammonium sulfate and hydroxylammonium acid sulfate; hydroxylammonium phosphates; and hydroxylammonium nitrate. The solvent in these solutions may include non-aqueous solvents, such as alcohols or glycols, water, or mixtures thereof, with water being the most commonly used solvent. To simplify the disclosure, the process will be described using aqueous solutions of hydroxylammonium nitrate, a preferred embodiment.

Aqueous solutions of hydroxylammonium nitrate to be concentrated by the process of the present invention may contain any suitable concentrations of hydroxylammonium nitrate from which water is to be removed. Normally, the aqueous solution will be a dilute solution of hydroxylammonium nitrate, for example, as produced by electrolysis, having a percent by weight of hydroxylammonium nitrate of less than about 30 percent.

The dilute aqueous solution is contacted with one side of a membrane which permits and promotes the sorption of water and passage through the membrane to the opposite side. As used herein, the term membrane is intended to include any barrier which is substantially permeable to the solvent and substantially impermeable to the solute.

Generally, the membrane is comprised of a resinous matrix, such as a cross-linked polymer. The resins which can be used to produce the membranes include, for example, fluorocarbons, vinyl compounds, polyolefins, and copolymers thereof.

Suitable fluorocarbon resins include polytetrafluoroethylene (PTFE), polychlorotrifluoroethylene (PCTFE), fluorinated ethylene-propylene copolymer (FEP), ethylene-chlorotrifluoroethylene copolymer (ETFE), perfluoroalkoxy resin (PFA) and TEFLON(®) EPE. Vinyl resins which can be used in membranes are exemplified by polyvinyl fluoride (PVF), polyvinylidene fluoride (PVDF), polyvinyl chloride (PVC), polyvinylidene chloride (PVDC), chlorinated polyvinylchloride (C-PVC), divinyl benzene and the like. Membranes may also have as the resinous matrix polyolefins such as polyethylene, polypropylene, polybutylene, polypentylene, and polyhexylene. Preferred as membranes are those of fluorocarbon resins and vinyl resins such as divinyl benzene.

The membrane selected should facilitate the sorption of the solvent water from the hydroxylammonium nitrate solution and permit its passage through the membrane to the opposite side. Hydrophilic properties can be provided to the membranes. For example, by the selection of pore sizes, by surface treatments of the membrane, or by incorporating functional groups in the membrane the sorption of water may be improved.

In general, uncharged (or non-charged) membranes, anion exchange membranes or cation exchange membranes may be employed in the novel process of the present invention. However, when concentrating solutions of hydroxylammonium nitrate to prevent or minimize the passage of anions through the membrane, it exchange memberanes are well-known to incorporate is preferred to use a cation exchange membrane. Cation negative or anionic groups that permit passage and exchange of cations and exclude anions.

Hydrophilic functional groups which may be incorporated include any suitable anionic groups which permit the sorption of water by the membrane. Suitable anionic groups include sulfonic, carboxylic, phosphoric, phosphonic, phosphinic, arsenic, selenonic, and telluric groups in their various valence forms, and mixtures thereof. As hydroxylammonium nitrate is sensitive to decomposition by strong acid groups, preferred anionic groups are those having a pKa of about 6 or less, for example, for about 0.1 to about 6, preferably less than about 4, i.e., from about 0.5 to about 4, and more preferably in the range of from about 1 to about 2. Examples of the preferred anionic groups include sulfonic ($-SO_3^=$), carboxylic ($-COOH^-$), and phosphonic ($PO_3H_2^-$), and mixtures thereof.

More preferred as cationic exchange membranes are perfluorosulfonic acid membranes which are homogeneous structures, i.e., single layered membranes of fluorocarbon polymers having a plurality of pendant sulfonic acid groups.

Suitable cation exchange membranes are sold commercially by Ionics, Inc., by E. I. du Pont de Nemours & Co., Inc. under the trademark "NAFION(®)", and by the Asahi Chemical Company under the trademark "ACIPLEX(®)".

Water passes from the aqueous solution of hydroxylammonium salt through the membrane under capillary flow or pressure forces. The water is then desorbed from the desorption side (opposite side) of the membrane. The rate of desorption of water should not be greater than the flow rate of water through the membrane. In one embodiment, the membrane is contacted with an unreactive gas to desorb the water. Any suitable unreactive inorganic or organic gas may be argon, methane, sulfur oxides, pentane, etc. The gas used. Examples includes air, nitrogen, hydrogen, neon, should initially have a low moisture content. Preferred gases are those having higher thermal conductivity. The gas for desorption of water may be at ambient or elevated temperatures and at atmospheric or superatmospheric pressures.

In the concentration of solutions of hydroxylammonium nitrate, unreactive inorganic gases such as air, nitrogen, hydrogen, neon and argon are employed which are free of acid-forming groups such as $CO_2$, sulfur oxides, nitrogen oxides and the like.

In another embodiment, pressure is applied to the solution of hydroxylammonium salt to enhance the flow rate of water though the membrane.

In a preferred embodiment, a vacuum is applied to the side of the membrane having water to be removed.

To increase the rate of desorption of water from the membrane, heat may be employed. Where a gas is example, through a membrane support (see, for example, membrane supports 5 as illustrated in the FIGURE), or heating elements incorporated in the membrane. Temperatures used will be dependent on the heat sensitivity of the hydroxylammonium salt but will not normally exceed about 200° C. As hydroxylammonium nitrate is more sensitive to heat than other hydroxylammonium salts, temperatures for the desorption of water should be maintained at those which prevent the temperature of the hydroxylammonium nitrate solution from exceeding about 60° C., and preferably maintain the solution at temperatures in the range of from about 10° C. to about 50° C.

Where heating is provided to increase water vaporization rates by elements incorporated in or in direct contact with the desorption side of the membrane opposite that side in contact with the aqueous solution, it may be desirable to cool the hydroxylammonium salt solution to minimize the possibility of thermal decomposition of the hydroxylammonium salt.

The novel process of the present invention may produce concentrated solutions of hydroxylammonium salts at any suitable concentrations which are greater than the dilute aqueous solution of the hydroxylammonium salt used as the starting material. Where the hydroxylammonium nitrate solution will be used as a component of a propellant composition, concentrated solutions should contain at least 50 percent, and preferably in the range from 70 percent to about 85 percent by weight of hydroxylammonium nitrate ($NH_3OH^+NO_3^-$). The corresponding density of these concentrated solutions is at least 1.25, preferably at least 1.4, and more preferably at least 1.5 grams per milliliter.

Liquid propellants containing hydroxylammonium nitrate may also be concentrated by the process of the present invention after blending dilute solutions of the components.

As aqueous solutions of some hydroxylammonium salts have a tendency to pick up water, i.e., hydrate, for example, during storage, the process of the present invention may be employed to remove undesired water of hydration prior to use.

Highly concentrated aqueous solutions of hydroxylammonium salts which are heat sensitive are produced by the novel process of the invention which does not require directly heating the solution and is substantially free of hazards.

To further illustrate the process of the present invention without being limited thereby, the following examples are presented. All parts and percentages are by weight unless otherwise indicated.

EXAMPLE 1

An aqueous solution of hydroxylammonium nitrate containing 26.5 percent by weight of $NH_3OH^+NO_3^-$ and a density of 1.135 g/ml was fed to the liquid chamber of a cell of the type illustrated in the FIGURE. The aqueous solution contacted one side of a cationic exchange membrane (NAFION(®) 117, a product of E. I. du Pont de Nemours & Co., Inc.), 2.5 inches square. Water was sorbed by the side of the membrane in contact with the aqueous solutions and desorbed on the opposite side of the membrane. Nitrogen gas was charged at a rate of 8–17 scf/h and at a temperature in the range of 20°–35° C. to the gas chamber to vaporize water passing through the membrane. Periodically, the hydroxylammonium nitrate solution was drained from the liquid chamber, the concentration of hydroxylammonium nitrate and the solution density determined, and the solution returned to the liquid chamber. The results are given in TABLE I below.

TABLE I

| Operating Time (days) | Hydroxylammonium Nitrate Concentration (weight percent) | Solution Density (g/ml) |
|---|---|---|
| 0.0 | 26.3 | 1.135 |
| 12.8 | 60.6 | 1.37 |
| 27.0 | 74.4 | 1.46 |
| 43.7 | 77.0 | 1.51 |
| 63.3 | 83.2 | 1.55 |

EXAMPLE 2

An aqueous solution of hydroxylammonium nitrate containing 24.0 percent by weight of $NH_3OH^+NO_3^-$ (density 1.13 g/ml) was fed to the liquid chamber of the cell of the type illustrated in the FIGURE. The opening in the one end of the gas chamber was plugged. A vacuum line was connected to the opening in the opposite end. A perfluorosulfonic acid cation exchange membrane (732 eq. wt.) (1×4 inches) separated the liquid chamber from the gas chamber. A vacuum of 28-29 inches Hg was applied to desorb water from the gas side of the membrane. The water vapor removed was condensed in a cold trap. After operation for 21 hours, the concentration of hydroxylammonium nitrate had increased to 51.3 percent by weight of $NH_3OH^+NO_3^-$ and the solution density was 1.30 g/ml.

What is claimed is:

1. A process for concentrating a dilute solution of an inorganic hydroxylammonium salt by contact with a membrane having a sorption side and a desorption side, which process comprises:
   (a) contacting the dilute solution with the sorption side of a membrane, which is substantially permeable to the solvent and substantially impermeable to the solute of the solution, to sorb the solvent and permit the solvent to flow through the membrane to the desorption side, whereby a concentrated solution of hydroxylammonium salt is produced, and
   (b) desorbing the solvent from the desorption side of the membrane.

2. The process of claim 1 in which the dilute solution is an aqueous solution and the solvent is water.

3. The process of claim 1 in which the inorganic hydroxylammonium salt is selected from the group consisting of hydroxylammonium halides, hydroxylammonium sulfates, hydroxylammonium phosphates, and hydroxylammonium nitrate.

4. The process of claim 1 in which the membrane is a resin selected from the group consisting of fluorocarbons, vinyl compounds, polyolefins, and co-polymers thereof.

5. The process of claim 1 in which the desorption of the solvent comprises contacting the desorption side of the membrane with an inert gas.

6. The process of claim 1 in which the desorption of the solvent comprises applying a vacuum to the desorption side of the membrane.

7. The process of claim 2 in which the inorganic hydroxylammonium salt is selected from the group consisting of hydroxylammonium halides, hydroxylammonium sulfates, hydroxylammonium phosphates, and hydroxylammonium nitrate.

8. The process of claim 2 in which the membrane is a resin selected from the group consisting of fluorocarbons, vinyl compounds, polyolefins, and co-polymers thereof.

9. The process of claim 2 in which the desorption of the solvent comprises contacting the desorption side of the membrane with an inert gas.

10. The process of claim 2 in which the desorption of the solvent comprises applying a vacuum to the desorption side of the membrane.

11. The process of claim 2 in which the inorganic hydroxylammonium salt is hydroxylammonium nitrate.

12. The process of claim 11 in which the membrane is a cation exchange membrane having hydrophilic functional groups incorporated therein.

13. The process of claim 12 in which the hydrophilic functional groups are anionic groups having a pKa in the range of from about 0.1 to about 6.

14. The process of claim 13 in which the desorption of the solvent comprises contacting the desorption side of the membrane with an unreactive gas substantially free of acid-forming groups.

15. The process of claim 14 in which the unreactive gas is selected from the group consisting of air, nitrogen, helium, hydrogen, neon, argon, and mixtures thereof.

16. The process of claim 11 in which the temperature of the dilute aqueous solution is maintained in the range of from about 10° to about 50° C.

17. The process of claim 12 in which the ion exchange membrane is a polymer or copolymer of a fluorocarbon resin or vinyl resin.

18. The process of claim 17 in which the hydrophilic functional groups are selected from the group consisting of sulfonic acid, carboxylic acid, phosphonic acid, and mixtures thereof.

19. The process of claim 18 in which the ion exchange membrane is a perfluorosulfonic acid membrane.

20. The process of claim 11 in which the desorption of the solvent comprises applying a vacuum to the desorption side of the membrane.

21. The process of claim 11 in which the concentrated aqueous solution contains at least 50 percent by weight of hydroxylammonium nitrate.

* * * * *